No. 747,968. PATENTED DEC. 29, 1903.
L. GUTMANN.
ELECTRIC METER.
APPLICATION FILED JAN. 6, 1902.
NO MODEL.
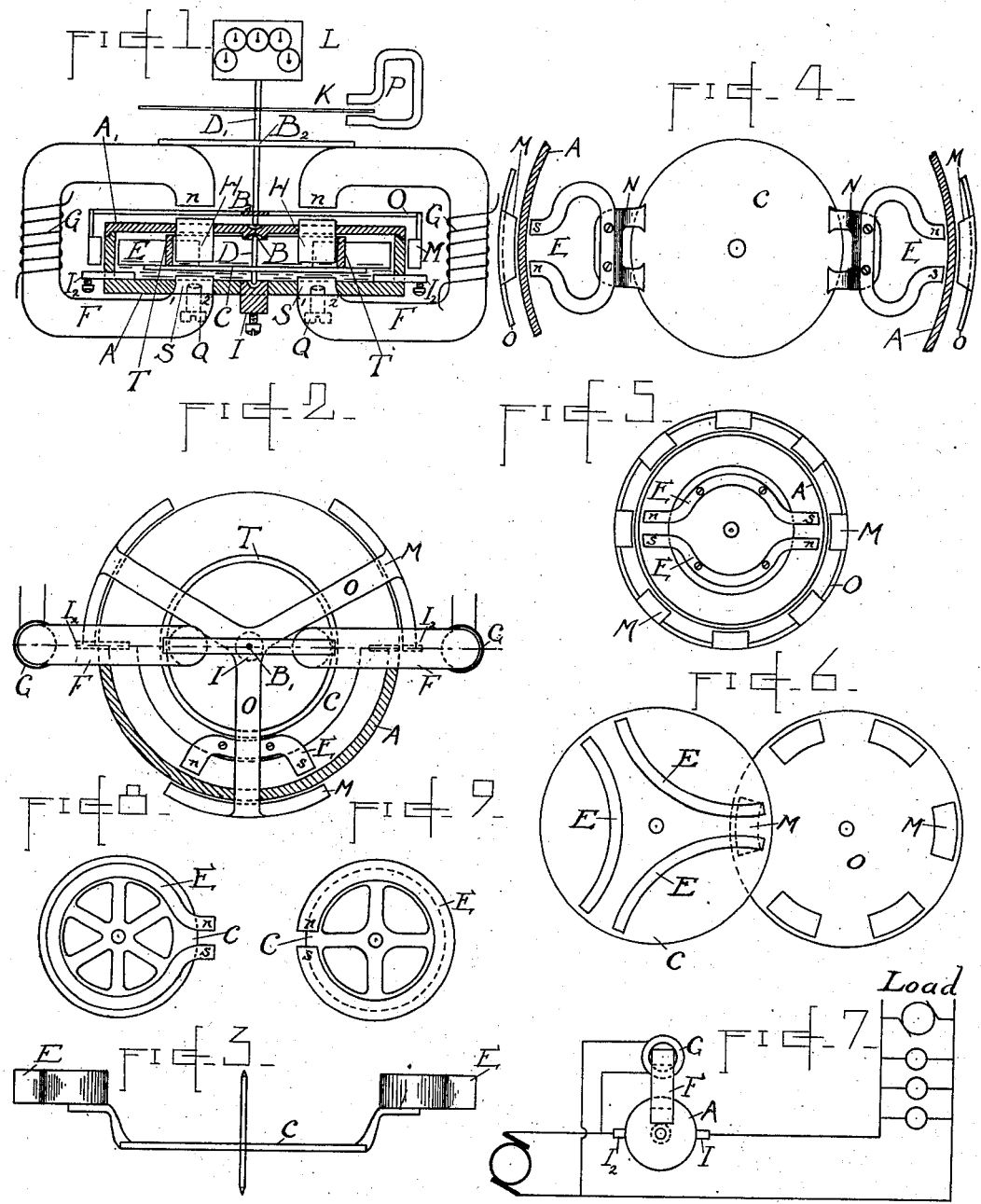
WITNESSES:
INVENTOR
Ludwig Gutmann
BY
ATTORNEYS
THE NORRIS PETERS CO., PHOTO-LITHO., WASHINGTON, D. C.

No. 747,968.                                                         Patented December 29, 1903.

UNITED STATES PATENT OFFICE.

LUDWIG GUTMANN, OF PEORIA, ILLINOIS, ASSIGNOR TO THE SANGAMO ELECTRIC COMPANY, OF SPRINGFIELD, ILLINOIS, A CORPORATION OF ILLINOIS.

ELECTRIC METER.

SPECIFICATION forming part of Letters Patent No. 747,968, dated December 29, 1903.

Application filed January 6, 1902. Serial No. 88,509. (No model.)

*To all whom it may concern:*

Be it known that I, LUDWIG GUTMANN, a citizen of the United States, residing in Peoria, in the county of Peoria and State of Illinois, have invented a novel type of Electric Meter, of which the following is a specification.

My invention relates to a new and useful appliance for measuring electric currents of the direct, alternating, pulsating, or intermittent type. It presents, however, especial advantages for the measurements of direct and pulsatory current in ampere hours or watt hours.

It is a well-known fact that wattmeters, especially for measuring direct currents, have many defects and undesirable characteristics. The motor-meter with a commutator, although accurate when new, rapidly changes its constant, due to the gradual increase of roughness of the commutator and consequent increase of friction between commutator and brushes. This change, which makes the meter many per cent. slow, and hence unreliable, imposed on the user the task of frequent inspection, test, and repairs to enable their continued use. Other meter types having heavy masses swinging or oscillating, although accurate in their readings, are expensive, complicated, and cumbersome and difficult to install. Lastly, mercury meters have the greatest drawback on account of the spilling and oxidizing of the mercury, which invariably and unavoidably takes place in handling this conducting fluid. Although its excellent and lasting qualities as good contact makers are fully appreciated, such meter is distasteful to central stationmen and electricians alike, because the mercury must be handled, will spill, and if any is lost during the handling or transporting of the meter no one knows whether this loss does not alter the relation of the meter parts or even cause an open circuit.

My present invention relates to improvements in the construction of a motor-meter in which the motor element has an armature consisting of a disk or piece of metal of any desired shape rotating in a conducting fluid through which current is conveyed to and from said armature combined with a proper energizing field-magnet.

The object of my invention is to produce a meter that may be handled like any motor-meter of the type heretofore employed and which shall be free from the objections hereinbefore stated.

To these ends my invention consists in the novel features of construction and combinations of parts, as more fully described in connection with the accompanying drawings, in which—

Figure 1 is a view in elevation and part section of one form of my meter. Fig. 2 is a plan view of the same. Figs. 3 and 4 show a preferred form of armature and magnetic-gear attachment. Fig. 5 shows a modified magnetic gear; Fig. 6, a non-concentric arrangement of a magnetic gear. Fig. 7 shows a diagram of circuit connections of the meter, and Figs. 8 and 9 show further modifications of gear-driving magnets.

In all figures similar reference-letters refer to like parts.

Referring in particular to Fig. 1, A indicates a shallow box, preferably made with its sides and bottom in one piece, as indicated, and preferably, also, of insulating material. If desired, hard rubber may be used for the purpose, or the box may be of metal and have a lining for its sides and bottom made of insulating material. A' is the cover, which is of any desired material, either insulated or metallic, and which closes the top of the box tightly, being secured in position by any desired means to prevent the escape of any contained liquid. C is the armature, which rotates in the mercury or other suitable conducting liquid, filling said box to about the level indicated by the dotted lines or sufficiently to immerse the armature C. The armature may be of copper, aluminium, or other suitable material and suitably fixed upon a shaft D, mounted in its opposite ends in pivot or stop bearings in the cover and bottom of the casing, respectively. Current passes to and from the armature through the body of mercury in which it is immersed, and in the case of the disk armature shown the connections should be made to cause the current to pass from the edge of the disk to the center, or vice versa. The connection to the center of the disk is formed through the spindle D and the bearing B', which is of metal, and is fixed in an opening in the bottom of the box in suitable manner to prevent leakage of the mercury around the edges of said bearing.

One of the main circuit-terminals, as indicated at I, consists of the bearing in which the spindle rotates. The other main circuit terminal or terminals are indicated at $I_2$. They simply consist of pieces of metal inserted in openings in the side of the insulated casing, near the bottom thereof, so as to be in contact with the mercury or other liquid. The number of said terminals $I_2$ would obviously depend upon the number of magnetic gaps or fields through which the disk armature rotates. In the form of my invention illustrated in the drawings, there being two field-magnets and two air-gaps, two terminals $I_2$ would be provided, and they are by preference in such case arranged on the same diametrical line.

F indicates magnets which provide such a magnetic field. Their opposite poles terminate, respectively, in or near the bottom and top of the casing A, as shown. One pole is preferably embedded in the bottom of the box and extends clear through, so as to be in as close proximity as possible to the lower side of the disk. By preference the opposite pole of the magnet terminates outside the cover. When the disk is located at some distance below the cover, it is desirable to provide a magnetic core-piece H, setting in an opening in the cover and extending down close to the upper face of the disk. This core-piece is in line with the free pole of the magnet and as close thereto as practicable, allowing by preference, however, space for the rotation of an arm or spider O, whose function will be shortly described. The core-piece H, being of magnetic material, forms a continuation of the upper or free magnetic pole and serves to bring the magnetic flux near to the rotary disk C. As will be seen by this organization, the disk rotates in one or more magnetic fields formed between magnet-poles presented to opposite sides of the disk between the center and edge thereof, one or more such fields being provided and each being a gap in the magnet-circuit of a single magnet.

The device, as shown, constitutes a motor, since, as is well known, the current sent through the mercury and armature from I to $I_2$, or vice versa, across the magnetic field of the magnet will cause rotation of said armature.

The magnets F may be either permanent magnets or electromagnets. If they are electromagnets, their windings G would be normally connected across the circuit as a high-resistance shunt. If the magnet F is a permanent magnet, the speed of the armature will be practically proportional to the current sent through the mercury, and if the field is caused by an electromagnet, with the winding G shunted across the line or circuit whose energy is to be measured, the speed of rotation will be practically proportional to the energy passed.

To transmit the motion of the incased motor-armature to any external device—as, for instance, a counting-train—I employ a magnetic means for imparting or transferring motion, one element of said magnetic transmission device being located within the casing and the other in proximity thereto on the exterior of the casing. This device I term a "magnetic" transmission device, since it performs in a magnetic way the same function as any mechanical transmission device. When this magnetic transmission device is organized to produce a rotation of its external element from the rotation of its internal element, it may be conveniently termed a "magnetic gear." The internal element of the gear, which moves with the armature, consists, preferably, of one or more horseshoe permanent magnets E, mounted upon the armature and having their free poles extended toward a circular wall of the box A, with just enough clearance to insure free rotation when the armature is in motion. The weight of these magnets is counterbalanced by the buoyancy of the mercury, and no strain or pressure is exerted by their presence on the lower bearing B'. The external element of the magnetic gear consists of any desired number of armatures M, mounted on a suitable support which permits them to travel in a circular path concentric with the poles of the magnets E. These armatures travel as near to the outside of the box as possible, so as to be well within the field of the permanent horseshoe-magnets E. They may be carried by a disk or spider O, which is preferably of nonmagnetic material and which is secured to a spindle D', supported in bearings $B^2$, one of which is upon the cover of the box and the other in a cross-piece between the field-magnets F or other suitable support. The disk or spider O moves in the gaps between the upper poles of the magnets F and the blocks or core-pieces H, as indicated.

The spindle D' engages the counting-train L and carries the damping-disk K, to which is applied the magnet P in the usual way, so as to produce rotation in exact proportion to the current or energy passing through the motor.

Fig. 2 is a plan view showing electromagnets F in position and the driving-magnets of the gear E and the external gear-teeth or magnetic circuit-closers in relative position to each other. If armature C rotates, the poles of the driving-magnets E endeavor to retain as close a magnetic circuit as is possible with the external core-blocks M and by so doing impart motion to them. Experiments have fully demonstrated that synchronous speed can be obtained and maintained between the driving magnet or magnets and the gear-teeth M, and thereby transmit the exact speed of the entirely-closed armature to an external spindle, which in turn operates the counting-train in a well-known manner. It may be conveniently mentioned at this point that as far as the result is concerned it is immaterial whether the driving-magnets or the blocks are located on the armature, although for obvious reasons it is preferable in this particular case to have the magnets mounted on the armature.

Figs. 3 and 6 show a preferred armature form C and gear having arms N bent upward adapted to carry the two magnets E of peculiar shape. They have a broad back or yoke, and their poles are brought closely together near the rim of box A. By this disposition the magnets may be carried above the surface of the mercury. They are especially aged and retain their strength for years, as has been fully demonstrated. The keepers or teeth M of this gear are light and short iron or steel blocks adapted to concentrate the flux at the magnet-pole tips. By reducing the weight of the gear-teeth M the weight of the rotary external transmitting device becomes very light and can therefore readily follow the driving-magnets E.

Fig. 5 shows a modified transmitting-gear. Although but two driving-magnets semicircular in shape are supplied on disk C, a multiple of transmitting-teeth are provided on support O. If a large load is thrown onto the circuit very suddenly and if the transmitting-gear would possess some inertia or friction, a tooth M may lose its position in front of a pair of poles, and to prevent a slip of half a revolution, as would occur with the disposition shown in Fig. 4, a number of intermediate teeth are attached to the support O.

Fig. 6 shows a magnetic gear in which the transmitting-spindle and gear-teeth are arranged non-concentric to the driving-magnets.

Fig. 7 shows in diagram the circuit connections of the meter, with the main current passing through the mercury and coil G in shunt to the main line.

The device is subject to numerous modifications, all of which are within the spirit of the invention. For instance, a single magnet F instead of two may be applied to actuate the armature, while, further, the terminal disposition may be different from the one shown in Fig. 1. It may be as in diagram Fig. 7, where they are shown diametrically opposite each other. For this latter disposition the magnetic circuit requires to be modified, as is well known and understood in the art.

Figs. 8 and 9 show still two other modifications of armature and driving-magnet. The armature is not a solid disk, but a ring with a spider, while the gear-driving magnet E is but a single one, circular in form, with its poles bent out in one form and with them in circular position in the other. Instead of using a box A of insulating material it may be made of metal and covered with some insulating-enamel to prevent the current from going through the metal rather than through the mercury.

The disk or spider O may consist of non-conducting material or metal; but the latter must be so disposed as not to cause a drag due to its passage in front of the magnet-poles.

By preference the box is hermetically sealed, or, in fact, an enamel applied to the box A after all the parts disposed internally have been inserted. However, it is readily understood that a less perfectly incased device cheaper to construct may be resorted to at the risk of spilling of mercury. The parts incased constitute the motive device of the motor, to which the gear-driving magnets are so organized as not to be weakened by main magnet F.

To make the motive device and inclosed parts readily removable from the rest of the meter and cheap to manufacture, it may be arranged so as to be readily detachable from the main magnet F. This is accomplished by cutting the lower poles S at lines 1 2 flush with or slightly projecting from the bottom of box A, the magnet F being attached to the embedded pole-shoes by means of screws Q. If the gear-transmitting shaft is provided with but two transmitting-teeth, the self-contained box A is as readily removable from the meter by simply unscrewing screws Q and raising the spindle D'. If the device is to be applied to alternating or pulsatory current work, it may be preferable to laminate magnet F. Although the device has been described as immersed in mercury, it is fully operative if only the periphery and the center are so provided with a suitable electric contact, while the action of the magnet F may act on disk C only or simultaneously on the disk C and the mercury or conducting fluid.

In order to prevent disturbance in the action of the magnetic transmission device from the magnetism of the motor element of the apparatus, a magnetic shield or screen is interposed between the element of the magnetic transmission device which is liable to have its operation disturbed and the portion of the motor device from which magnetic lines of force may stray.

In the particular organization of apparatus shown a magnetic screen for this purpose is indicated at T. It consists in the present instance of a ring of magnetic material interposed between the poles of the main driving-magnet F and the magnet or magnets E, carried by the armature. This ring or shield, as will be readily understood, may be attached either to the cover or to the disk and will act to prevent any lines of force from the driving or main magnet from reaching the permanent magnet forming one element of the transmission device. As will be readily understood, the height of this screen will be regulated by circumstances.

Having now fully described the nature of my invention, what I claim is—

1. In a motor, the combination with a suitable armature in contact with a fluid-conductor, of a casing whose bottom and sides are made in one piece and, to a point above the level of the fluid-conductor, are of insulated material, a driving-magnet, a transmitting-gear and a register mechanism operated by said transmitting-gear.

2. In a meter, the combination with a metallic armature in contact with mercury, a field-magnet and a transmission-gear one element of which is secured to the armature and the other attached to a non-magnetic support passing through the magnetic circuit of the field-magnet.

3. In a meter the combination with an armature, a fluid-conductor and driving-magnet of a case inclosing these elements, having magnetizable bodies embedded in its structure to either side of said armature, means such as an external magnet system for energizing said bodies, a motion-transmitting gear actuated by said driving-magnet and a registering mechanism engaged by said gear.

4. In a motor-meter the combination with an energizing-magnet system, motion-transmitting device and registering mechanism, of a motion-producing armature in contact with a current-consuming circuit, a permanent magnet rotated by said armature, and a case, inclosing and retaining said armature and permanent magnet, integrally removable from the stationary elements.

5. In an electric meter the combination with an armature and gear-driving magnet, a case inclosing the same and a magnetic energizing system for actuating said armature having detachable core parts embedded in said case.

6. In an electric meter the combination with a rotating armature, a permanent magnet connected to said armature and inclosed in a fluid-tight case, of an energizing system for actuating said armature, and a magnetic screen interposed between said permanent magnet and said magnetizing system.

7. In an electric motor-meter and in combination with a sealed armature, of means for transmitting the rotation from within to outside of the case and an energizing-magnet system having a detachable pole embedded in said casing.

8. In an electric motor-meter and in combination with a fluid-tight incased armature, of means for transmitting the rotation of said armature from within to the outside of the case and other additional means such as a sectional magnet system for removing said case from the remaining elements.

9. In an electric motor-meter the combination with a fluid-tight case, a rotatable armature and a permanent magnet retained therein, of a magnet system and core parts or poles forming part of said magnet system permanently embedded in said casing.

10. In an electric motor-meter the combination with an entirely-incased armature and a magnetic transmission-gear, of a magnetic energizing system for said armature having two air-gaps, one adapted to admit the said armature the other the external part of said gear.

11. In an electric motor-meter and in combination with an entirely-inclosed armature, a magnet in fixed relation to said armature and a magnet system for the same, a separately-journaled spindle, a support of insulating material mounted on said spindle and magnetic or magnetizable bodies mounted on said support and in inductive proximity to the magnets named first.

12. In a magnetic gear and in combination with a motor-meter of one or more teeth of magnetic or magnetizable material and a driving-magnet of a circular shape.

13. In a magnetic gear and in combination with a motor-meter of one or more gear-teeth suitably mounted and a driving-magnet mounted separately consisting of a circular magnetic conductor having the continuity of its body interrupted by an opening.

14. In a magnetic gear the combination with two non-concentric shafts of a driving-magnet mechanically supported by one of said shafts and separate and independent teeth mechanically supported on the other shaft.

15. In a motor-meter, the combination with a disk armature rotating in a suitable casing containing mercury or other conducting liquid by which current is passed to or from the disk, of one or more field-magnets for actuating said disk armature, a magnetically driven revolution-transmitter actuating the dial and a separator for the magnet-fields of said field-magnets and revolution-transmitter.

16. In a motor-meter, the combination substantially as described, of a box of insulating material, a disk armature, a spindle carrying the same, pivots or stop-bearings for said spindle, one in the cover of the box and the other in a piece of metal set into the bottom thereof, and one or more field-magnets whose opposite poles are presented to said disk between the axis and edge thereof.

17. In a motor-meter, the combination substantially as described, of an internal armature, an external field-magnet and a magnetic gear one element of which is carried by the armature within the casing and the other by a support rotating without the casing in a gap in a magnetic circuit of the field-magnet.

18. In an electric meter, the combination substantially as described, of an inclosed armature, an external field and a magnetic gear having an internal element carried by the armature and an external element mounted upon a spider whose arms extend through gaps in the magnetic circuit of the field-magnet.

19. The combination substantially as described, of the disk armature carrying horseshoe-magnets whose poles are located near the sides of the containing casing for said armature and external armatures within the field of said horseshoe-magnets carried by a suitable spindle or support mounted vertically over the axis of said disk armature.

20. In a motor-meter, the combination substantially as described of the casing A, disk C, spindle D, mounted in bearings in the bottom of casing A and in the cover therefor, magnets E carried by the armature, a spindle D', armatures M, and disk or spider O all combined and operating as described.

21. In a motor-meter, the combination of the internal element of the magnetic transmission-gear furnishing one or more rotating magnetic fields, and an external element having a greater number of armatures coöperating therewith in order to limit the slip as and for the purpose described.

22. In a magnetic transmission-gear for meters, the combination of one or more rotating magnetic fields constituting the driving element and a driven element presenting to the revolving poles of said magnetic fields a multiple of points or paths for the lines of force of said fields.

23. In a magnetic transmission-gear, the combination of a rotating device, a casing therefor, one or more magnets having a broadened back or yoke and poles brought close together near the interior surface of the casing, and an armature or armatures near the exterior surface of the casing mounted upon a suitable support.

24. The combination with a driving electric motor, of a magnetic transmission device one element of which rotates with said motor, and a magnetic screen for shielding the same from the lines of force emanating from the magnet of the motor device.

25. In a motor-meter, the combination of an electric motor, a magnetic transmission device connected with the register mechanism and a magnetic screen between the transmission device and the field of the motor.

26. The combination substantially as described of a disk armature, a magnet carried thereby, and constituting one element of a magnetic transmission-gear, a motor field-magnet acting on said disk, and a ring or shield of magnetic material interposed between the poles of said field-magnet and the element of the magnetic transmission device.

27. The combination with the rotating permanent magnet and the stationary motor-magnet, of a magnetic shield having uniform magnetic reluctance with respect to the field to which it is relatively in motion.

In witness whereof I have signed my name, in the presence of two witnesses, this 2d day of January, 1902.

LUDWIG GUTMANN.

Witnesses:
JOHN DADMUN,
W. J. RICHARDS.